United States Patent [19]
Spelt

[11] Patent Number: 6,161,329
[45] Date of Patent: Dec. 19, 2000

[54] AUTOMATIC WATERING DEVICE FOR POTTED PLANTS

[76] Inventor: Jacob Spelt, 1812 Pastel Crescent, Saanichton, British Columbia, Canada, V8M 1N6

[21] Appl. No.: 09/079,307

[22] Filed: May 13, 1998

Related U.S. Application Data

[63] Continuation-in-part of application No. 08/594,800, Jan. 31, 1996, Pat. No. 5,848,494.

[51] Int. Cl.[7] ............................. A01G 9/02; A47G 7/02
[52] U.S. Cl. ............................. 47/67; 47/79; 141/83; 141/201
[58] Field of Search ................ 47/67, 79; 141/201, 141/83

[56] References Cited

U.S. PATENT DOCUMENTS

| | | | |
|---|---|---|---|
| 2,501,727 | 3/1950 | Kubista | 137/68 |
| 3,293,799 | 12/1966 | Keller et al. | 47/38 |
| 3,808,385 | 4/1974 | Klinefelter | 200/61.04 |
| 3,910,300 | 10/1975 | Tal | 137/78 |
| 4,170,089 | 10/1979 | Smrt | 47/67 |
| 4,241,538 | 12/1980 | Lahr | 47/79 |
| 4,480,465 | 11/1984 | Chase | 73/73 |
| 4,562,959 | 1/1986 | Pointer, Jr. | 47/67 |
| 4,760,666 | 8/1988 | Han | 47/79 |
| 4,825,591 | 5/1989 | Han | 47/67 |
| 5,421,122 | 6/1995 | Hyndman | 47/67 |

FOREIGN PATENT DOCUMENTS

| | | | |
|---|---|---|---|
| 2819650 | 11/1979 | Germany | 47/79 C |
| 3207992 | 10/1983 | Germany | 47/79 C |
| 3331640 | 3/1985 | Germany | 47/79 C |
| 2190573 | 11/1987 | United Kingdom | 47/79 C |
| 2246418 | 1/1992 | United Kingdom | F16K 31/00 |
| 2281492 | 3/1995 | United Kingdom | 47/79 C |

*Primary Examiner*—Michael J. Carone
*Assistant Examiner*—Joanne C. Downs
*Attorney, Agent, or Firm*—Kelly Bauersfeld Lowry & Kelley, LLP

[57] ABSTRACT

An improved watering device is provided for automatically watering one or more potted plants with a predetermined volume or quantity of water, in response to the weight of the potted plant which indicates the moisture content of the plant soil. The watering device comprises a plant carrier for movably suspending the potted plant from a hanger assembly, with a main spring reacting between the plant carrier and hanger assembly for controlling the vertical position of the plant carrier in response to the weight of the potted plant. Upon upward displacement of the carrier as the plant soil dries, an adjustably set and spring-loaded pin engages and operates a control member such as an electrical switch for opening a water flow valve to deliver water to the potted plant, whereupon the carrier translates downwardly as water is added to the plant soil ultimately to result in sufficient disengagement with the control member to close the water flow valve and halt water flow to the potted plant. In an alternative form, the control member may comprise the water flow valve. In either case, adjustment of actuator pin position and the spring force applied thereto permits relatively simple selection of specific weight-responsive set points for turning the water flow on and off.

21 Claims, 4 Drawing Sheets

AUTOMATIC WATERING DEVICE FOR POTTED PLANTS

RELATED APPLICATION

This application is a continuation of U.S. patent application Ser. No. 08/594,800, filed Jan. 31, 1996 now U.S. Pat. No. 5,848,494, entitled SELF-WATERING PLANT CONTROL.

BACKGROUND OF THE INVENTION

This invention relates generally to devices and systems for automatically watering one or more potted plants. More particularly, this invention relates to an improved automatic watering device designed for delivering water in response to the weight of a potted plant which indicates the moisture content of the plant soil, wherein the watering device can be adjustably set quickly and easily to provide specific weight-responsive set points for turning the water flow on and off.

Automated watering devices are generally known in the art for periodically delivering irrigation water to a potted plant. In one common form, the watering device includes a timer for operating a water flow valve at programmed time intervals to water the plant. Such devices, however, inherently deliver water to the plant according to the timed schedule without regard to actual plant need which can and frequently does vary significantly in response to changing humidity and variable sunlight conditions as well as the presence of natural rainfall. To account for these variables while preventing undesirable under-watering, time-function watering devices are usually operated in a manner maintaining the plant in an over-watered condition. Unfortunately, plant over-watering is not suitable for optimized plant growth and associated root development.

Alternative devices for watering a potted plant have been developed, wherein a water flow is turned on and off in response to weight which is reflective of plant and soil moisture content. In watering devices of this type, the potted plant is typically suspended or hung from a spring-loaded hanger adapted to sense the weight of the potted plant and to respond thereto for opening and closing a water flow valve. See, for example, U.S. Pat. No. 4,825,591 and British Patents 2,190,573; and 2,246,418. In general, however, these weight-response watering devices have been relatively complex in construction and operation, particularly with respect to adjustment of specific weight-responsive set points applicable to a specific plant type, size, and weight. Moreover, such devices have tended to turn the water flow on and off within a narrow weight range resulting in minimal variation of soil moisture content, and thus not creating a more natural prolonged dry interval conducive to optimal root development. Copending U.S. Ser. No. 08/594,800 discloses an improved watering device of the weight-responsive type, capable of providing a desired longer dry interval between watering cycles, but wherein the volume or weight of water delivered during each watering cycle is essentially fixed and thus not conducive to convenient adjustment to suit the needs of a particular plant type and size.

There exists, therefore, a continuing need for further improvements in and to devices and systems for automatically watering a potted plant, wherein water flow to the plant is turned on and off in response to specific and relatively easily adjusted weight-responsive set points. The present invention fulfills these needs and provides further related advantages.

SUMMARY OF THE INVENTION

In accordance with the invention, an improved automatic watering device is provided for watering one or more potted plants. The watering device comprises a plant carrier for spring-loaded support of a potted plant from a hanger assembly in a vertically variable position indicative of the weight of the potted plant. Upward displacement of the carrier, in response to drying of the plant and plant soil, translates a spring-loaded actuator pin into operative engagement with a control member to initiate water flow to the plant. As water is added to the plant soil, the weight increases and the carrier is displaced downwardly to a position ultimately permitting the control member to halt water flow. The position of the actuator pin relative to the control member, and the spring force applied thereto, are adjustable quickly and easily to select specific weight-responsive set points for turning the water flow on and off.

In one preferred form of the invention, the control member comprises an electrical switch having a contact arm adapted for movement between a normally open position and a closed position. The contact arm is engaged by the actuator pin for movement to the closed position at a predetermined low weight reflective of a dry state, to signal and operate a water flow valve to turn on the water flow to the suspended potted plant. As water is delivered to the plant soil, the weight of the potted plant increases to cause the carrier to translate downwardly relative to the hanger assembly. During such downward translation, a relatively low force set spring applies a sufficient retention force to the actuator pin for maintaining the contact arm in the closed position for continued water flow. The set spring is extended during this downward translation whereby the retention spring force is progressively reduced to a trigger point insufficient to maintain the contact arm in the closed position, at which time the contact arm returns to the open position signaling the water flow valve to turn off the water flow. In a preferred system arrangement, the suspended potted plant may comprise a so-called master for opening the water flow valve which supplies water through multiple flow lines to the master potted plant as well as to a plurality of so-called slaves, whereby a single automatic watering device of the present invention may be employed in a system for delivering a predetermined volume or weight of water to each of a plurality of potted plants.

The actuator pin is slidably carried within a bore formed in an actuator sleeve mounted on the carrier as by threaded engagement to permit vertical sleeve adjustment. An adjustment screw is threadably mounted in turn on the actuator sleeve, and the set spring reacts between the adjustment screw and actuator pin for biasing the actuator pin in a direction toward the control member. The actuator sleeve is adjustably positioned on the carrier to move the actuator pin into operative engagement with the control member for initiating water flow at a predetermined low weight set point indicative of a need for water. The adjustment screw is rotatably positioned on the actuator sleeve to partially compress the set spring in a manner setting the trigger point for halting the water flow at a predetermined maximum weight set point indicative of a fully watered state applicable to the particular plant size and type.

In an alternative preferred form of the invention, the control member may comprise the water flow valve mounted on the hanger assembly in a normal position closing a water flow path through which water can be delivered to the suspended potted plant. The actuator pin is adapted to engage and displace the flow valve to an open position permitting water flow through the hanger assembly, and preferably through drain ports formed in the carrier, to irrigate the plant soil. The actuator pin is slidably carried by the actuator sleeve which is adjustable to move the actuator pin against the flow valve for initiating water flow at the predetermined low weight set point, and the actuator pin is spring-loaded by the adjustable set spring to select the high weight set point for halting water flow.

Other features and advantages of the present invention will become more apparent from the following detailed description, taken in conjunction with the accompany drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the exemplary drawings, an improved watering device referred to generally in FIGS. 1–4 by the reference numeral 10 is provided for automatically watering one or more potted plants 12 in response to the weight of the potted plant which is indicative of the moisture content of the plant soil. The watering device 10 includes actuator means for causing water flow to the potted plant 12 when the plant and soil dry to a predetermined minimum weight set point, and for halting water flow to the plant 12 when sufficient water has been added so that the weight of the potted plant reaches a predetermined maximum weight set point. The actuator means is adjustable quickly and easily to select the minimum and maximum weight set points in accordance with the particular plant, pot size, and watering requirements for substantially optimized plant growth and root development.

The watering device 10 of the present invention is designed to deliver irrigation water to one or more potted plants 12 on an as-needed basis, with relatively prolonged periods between water delivery. More particularly, the watering device 10 functions to provide a predetermined and adjustably selected incremental volume or weight of water to the potted plant 12 only when the plant and soil have reached a predetermined and adjustably selected dry state and water is required. Conversely, the watering device 10 does not deliver water according to any regular time schedule irrespective of plant and soil dryness. Accordingly, the watering device provides water to the plant in a more natural cycle wherein substantial drying of the plant soil is permitted before additional water is added, resulting in a watering methodology which promotes substantially optimized plant growth and root development. Moreover, the watering device inherently accommodates routinely encountered variables such as temperature, direct sunlight, humidity, and natural rainfall to insure proper watering of the potted plant without undesirable over-watering.

Figure 1:
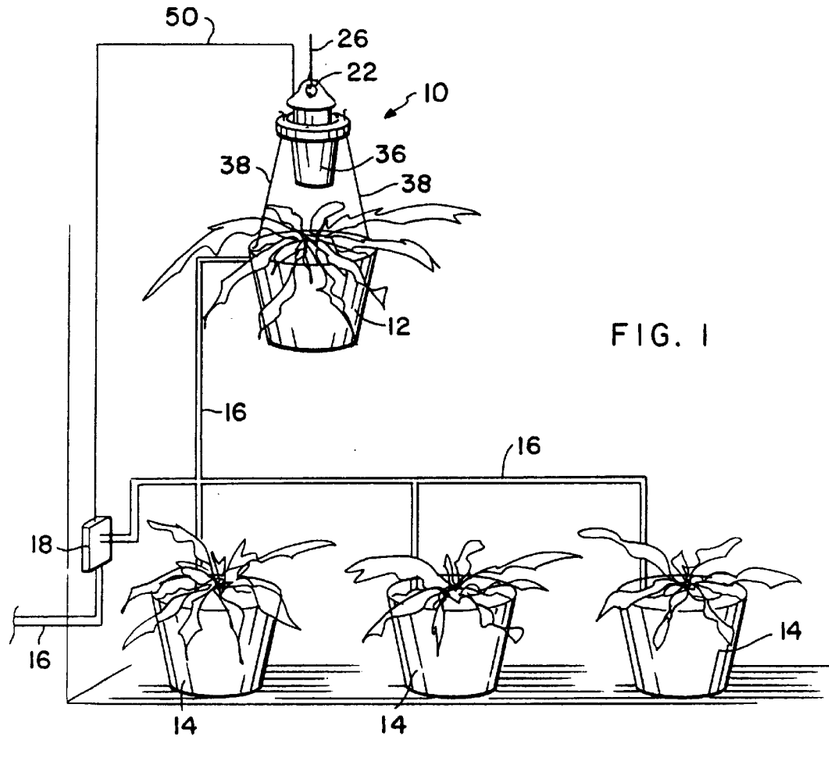
FIG. 1 is a perspective view, illustrated in somewhat schematic form, of an automatic watering device in accordance with the present invention for watering a master hanging potted plant together with a plurality of additional slave potted plants.

FIG. 1 illustrates the invention in one preferred form, wherein the watering device 10 is used to suspend or hang one potted plant 12 and to respond to the weight of the suspended plant for regulating water delivery to a plurality of additional potted plants 14 having generally similar watering demands. In this regard, the potted plant 12 associated with the watering device 10 comprises a so-called master plant for determining the water requirements of the remaining so-called slave potted plants 14 which need not be suspended from a hanger in a similar manner. A water line 16 is coupled via a control valve unit 18 to a suitable water supply source, and this water line 16 includes multiple branches for supplying irrigation water to each of the potted plants 12 and 14 in the system. In general terms, the watering device 10 responds to the weight of the suspended potted plant 12 to turn the control valve unit 18 on and off.

Figure 2:
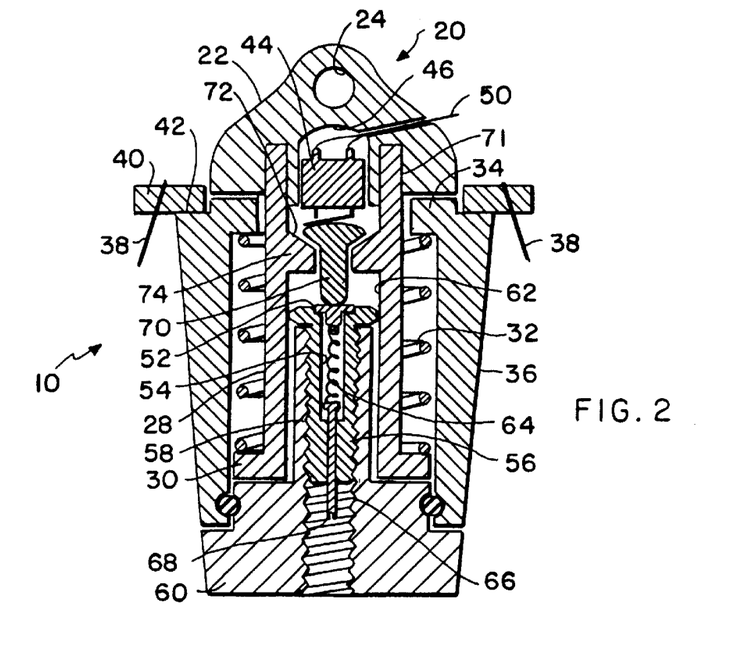
FIG. 2 is an enlarged and fragmented vertical sectional view of the automatic watering device of FIG. 1, depicting the device during initial calibration for selecting predetermined set points for turning water flow on and off.
Figure 3:
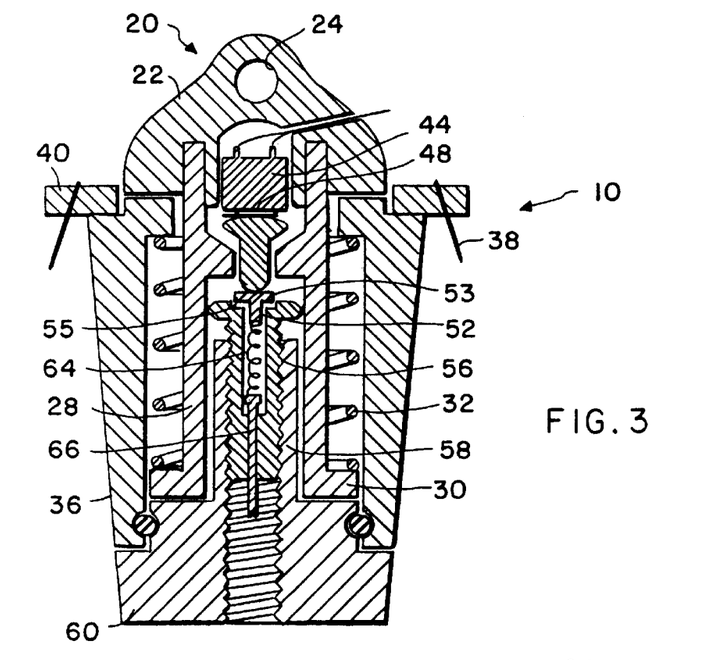
FIG. 3 is an enlarged and fragmented vertical sectional view similar to FIG. 2, but showing the device in a position actuating a control member to turn on water flow.
Figure 4:
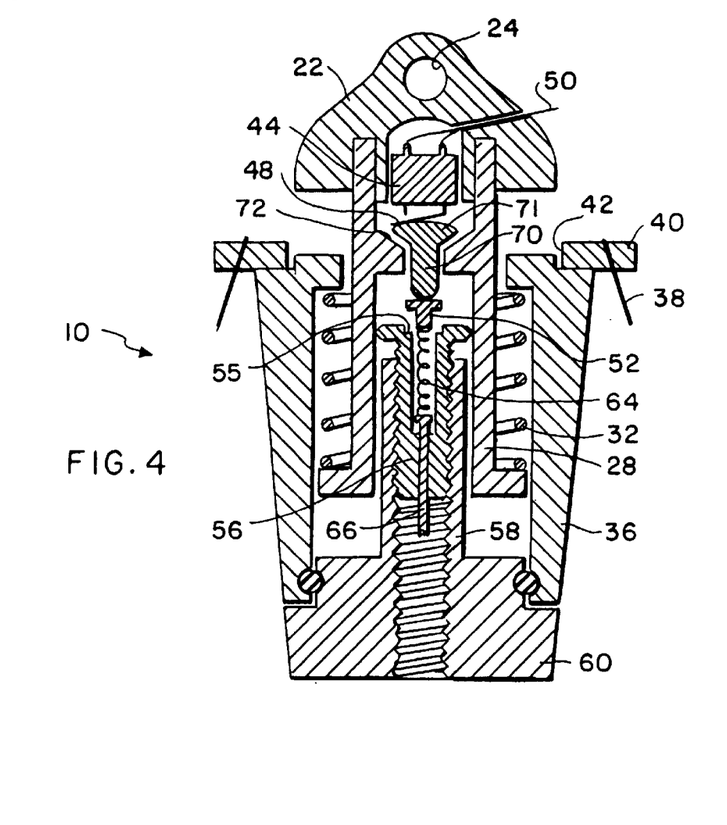
FIG. 4 is an enlarged and fragmented vertical sectional view similar to FIGS. 2 and 3, but illustrating the device in a position with the control member to turn off water flow.

The watering device 10 is shown in more detail in FIGS. 2–4. More particularly, in one preferred form, the watering device 10 comprises a hanger assembly or means 20 having an upper hanger bracket 22 with an eyelet 24 or the like formed therein for receiving a hook or cord 26 (FIG. 1) used to hang the watering device from a suitable overhead support (not shown). The upper bracket 22 supports a downwardly extending and generally cylindrical actuator housing 28 having an upper end secured to the bracket 22 as by a threaded or adhesive attachment, and a lower end defining a radially outwardly projecting stop flange 30. A main support spring 32 comprising a coil spring or the like is positioned about the actuator housing 28 and has a lower end seated upon the stop flange 30. An upper end of the main spring 32 engages and thus upwardly biases a radially inwardly directed stop flange 34 formed at the upper end of a generally cylindrical plant pot carrier 36 mounted slidably about the actuator housing 28. As shown in FIG. 2, the main spring 32 urges the carrier 36 upwardly to a position abutting or nearly abutting the underside of the hanger bracket 22.

The potted plant 12 is supported by the carrier 36, such as by suspending the potted plant by hanger wires 38 from an annular support ring 40 having a size and shape to rest upon an upwardly presented annular shoulder 42 on the carrier 36. Accordingly, the weight of the potted plant 12 is transmitted by the carrier 36 for vertical support by the main spring 32, which is in turn supported by the actuator housing 28 and hanger bracket 22. With this construction, the weight of the potted plant 12 causes the main spring 32 to compress, with the vertical position of the carrier 36 relative to the actuator housing 28 being reflective of such weight. Specifically, as the weight of the potted plant increases, for example, upon addition of water to the plant soil, the carrier 36 displaces downwardly about the actuator housing 28. Conversely, as the weight of the potted plant decreases during drying of the plant and soil between watering cycles, the carrier 36 displaces upwardly about the actuator housing 28. These weight-responsive displacements of the carrier 36 are utilized to regulate water flow to the potted plant.

FIGS. 2–4 illustrate a control member 44 in the form of an electrical switch for controlling the position of the valve unit 18 (FIG. 1) to turn the water flow on and off. This switch 44 is mounted into a downwardly open central recess 46 formed in the hanger bracket 22, and includes a contact arm 48 spring-loaded to a normal open position (FIGS. 2 and 4) and movable to a closed position (FIG. 3). Suitable conductors 50 extend from the switch 44 for connection to the control valve unit 18 (FIG. 1), which is suitable coupled with an appropriate source (not shown) of electrical power. When the contact arm 48 is in the closed position, the valve unit 18 such as a conventional solenoid-actuated valve opens to permit water flow to the plants 12 and 14. When the contact arm 48 is in the open position, the valve unit 18 closes to halt water flow. Importantly, in accordance with one aspect of the invention, the switch 44 is designed to require a relatively high force to be applied to the contact arm 48 for movement from the open position to the closed position to initiate water flow, and thereafter to require a considerably lower force to maintain the contact arm in the closed position. With this design, a first relatively high force is required to close the switch to begin water flow, and such water flow will continue until the force applied to the switch falls below a second lower force level. In a preferred form, the switch 44 is designed for contact arm closure at a force approximately three times that needed to maintain the contact arm in the closed position.

An actuator pin 52 is adjustably carried by the carrier 36 for operatively engaging the switch 44 to turn the water flow on and off. This actuator pin 52 has an elongates stem slidably carried within an upper end of a bore 54 formed in an actuator sleeve 56, wherein the actuator sleeve 56 is adjustably carried as by a threaded connection within a support sleeve 58 protruding upwardly from a base plate 60 attached to a lower end of the carrier 36. As shown, the support sleeve 58 extends upwardly into a hollow bore 62 formed in the actuator housing 28. A relatively light or low rate set spring 64 reacts between the underside of the actuator pin 52 and the upper end or head of an adjustment screw 66 threadably mounted within an otherwise closed lower end of the actuator sleeve 56. The lowermost end of the adjustment screw 66 is slotted, as indicated by reference numeral 68 to accommodate relatively quick and easy positional adjustment with a screwdriver (not shown).

The actuator pin 52 is urged upwardly by the set spring 64 to engage and contact the lower end of a poppet 70. The poppet 70 is positioned within the bore 62 of the actuator housing 28, with an enlarged poppet head 71 shaped to rest matingly upon a conical seat 72 defined by an inwardly radiating annular rim 74 formed in the actuator housing. The uppermost side of the head 71 is disposed in turn for engaging and operating the contact arm 48 of the electrical switch 44. Alternately, if desired, the poppet 70 may be omitted, in which case the actuator pin 52 is sized and shaped for directly engaging and contacting the switch contact arm 48.

In use, the potted plant 12 in a substantially dry and thus minimum weight condition is suspended from the watering device 10, with the actuator pin 52 and the related adjustment components in an initial uncalibrated position as viewed in FIG. 2. The actuator sleeve 56 is then rotationally advanced upwardly within the support sleeve 58 to lift the actuator pin 52 sufficiently to engage the poppet 70 which in turn bears against the switch contact arm 48. During this adjustment step, since the force required to move the contact arm 48 from the open position to the closed position exceeds the force applied to the actuator pin 52 by the set spring 64, the set spring 64 is retracted to permit an enlarged head 53 on the actuator pin to bottom out and seat within a mating seat 55 (FIG. 2) formed at the upper end of the actuator sleeve 56. After the actuator pin 52 bottoms out in the seat 55, further upward adjustment of the actuator sleeve 56 within the support sleeve 58 causes the actuator pin 52 acting through the poppet 70 to move the switch contact arm 48 to the closed position for signaling the control valve unit to turn on the water flow. Accordingly, this adjustment sequence enables selection of the minimum weight set point at which water flow is initiated for the particular potted plant.

As soon as the contact arm 48 of the switch 44 moves to the closed position as viewed in FIG. 3, the spring-loaded actuator pin 52 lifts slightly from the bottomed out position on the seat 55 so that the actuator pin 52 and poppet 70 follow the upward closure motion of the contact arm and continue to apply an upward force for retaining the contact arm 48 in the closed position. This retention force is applied by the set spring 64 reacting between the actuator pin 52 and the adjustment screw 66. Importantly, the set spring retention force is initially sufficient to maintain the contact arm 48 in the closed position, but is insufficient to shift the contact arm from the open position to the closed position. Moreover, the force applied by the set spring 64 to the actuator pin 52 is considerably less than the force applied by the main spring 32 to the carrier 36.

As water is added to the suspended potted plant while the contact arm 48 is closed, the weight of the suspended plant increases. This increasing weight results in downward displacement of the carrier 36 and compression of the main spring 32 about the actuator housing 28, as viewed in FIG. 4. During such downward movement, the set spring 64 progressively elongates to correspondingly reduce the spring retention force applied through the actuator pin 52 to the contact arm 48. Eventually, the magnitude of the retention spring force falls to a trigger point where it is insufficient to hold the contact arm in the closed position, at which time the contact arm springably returns to the normal open position as shown in FIG. 4 and water flow is halted. This trigger point corresponds with the maximum weight set point.

In accordance with a further important aspect of the invention, the adjustment screw 66 permits variable selection of the trigger point at which water flow to the suspended plant is halted, so that the volume or weight of water delivered to the plant during a watering cycle can be custom-selected according to the particular plant type and size. This adjustment is obtained by upwardly advancing the adjustment screw 66 within the actuator sleeve 56 for partial compression of the set spring 64. This effectively increases the initial spring force applied by the set spring, as described above, when water flow is initiated, and thereby delays the trigger point at which the subsequent extension of the set spring 64 causes the spring retention force to fall below a level sufficient to maintain the contact arm 48 in the closed position. Conversely, adjustment of the screw 66 for downward retraction within the actuator sleeve 56 decreases the initial spring force and thereby shortens the time delay between water flow initiation and increase of the potted plant weight to the maximum weight set point.

Once halted, the flow of water to the plants 12 and 14 will not resume unless and until the weight of the master potted plant 12 falls as a result of drying to the initial substantially dry and relatively low weight set point. As the plant and soil dry, the weight diminishes and the carrier 36 displaces upwardly as the main spring 32 re-extends. This upward movement is accompanied by progressive compression of the lighter rate set spring 64 to progressively increase the force applied through the actuator pin 52 and poppet 70 to the switch contact arm 48. Eventually, the set spring 64 sufficiently compresses so that the head 53 of the actuator pin 52 bottoms out on the seat 55, whereupon further upward motion of the carrier causes the actuator pin 52 to push the contact art 48 to the closed position for signaling the valve unit 18 to start another plant watering cycle.

An alternative preferred form of the invention is depicted in FIGS. 5–8, wherein components corresponding to those shown and described in FIGS. 1–4 are identified by common reference numerals. In this alternative embodiment, the actuator pin 52 is biased by the set spring 64 for engaging the poppet 70 which comprises the control member in the form of a valve head for directly regulating water flow along a flow path 76, in lieu of indirect control via the electrical switch 44 as previously shown and described.

Figure 5:
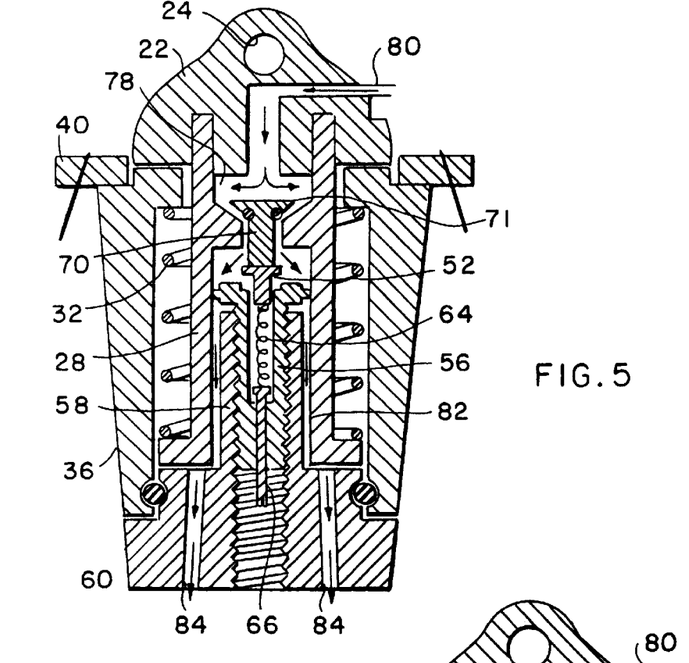
FIG. 5 is an enlarged and fragmented vertical sectional view generally similar to FIG. 3, but showing an alternative preferred form of the invention.
Figure 6:
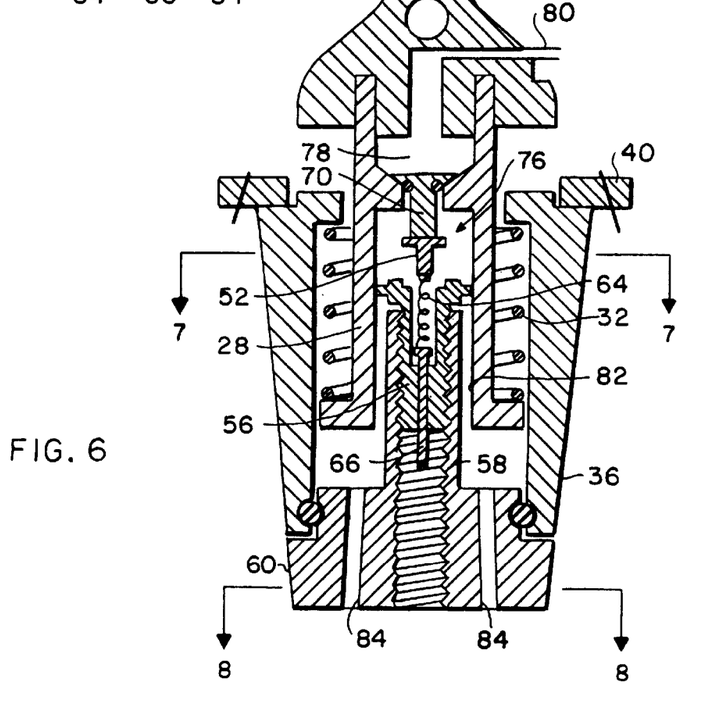
FIG. 6 is an enlarged and fragmented vertical sectional view generally similar to FIG. 4, and illustrating the embodiment of FIG. 5.

More specifically, as shown in FIGS. 5 and 6, the potted plant 12 is against supported by the carrier 36, which is in turn movably supported by the main spring 32 on the actuator housing 28 of the hanger assembly 20. The actuator sleeve 56 and the adjustment screw 66 are initially set as previously described so that the actuator pin 52 bears against the underside of the valve head 70 in a bottomed out position seated on the upper end of the actuator sleeve 56, as viewed in FIG. 5. In this position, the set spring 64 is compressed but the resultant spring force applied to the valve head 70 is not sufficient to move the valve head from its normally closed position on the seat 72. Further upward adjustment of the actuator sleeve position causes the actuator pin 52 to push against lift the valve head 70 to an open position, in opposition to the hydraulic water pressure acting against the larger area upper side or head 71 of the poppet for urging the poppet to a normally closed position. In this regard, the head 71 of the valve head 70 is exposed to water pressure within an inlet chamber 78 within the hanger bracket 22, wherein the inlet chamber 78 is coupled in turn to the water supply via a suitable water line 80. Importantly, with this geometry, a larger force is required to open the valve head 70, than to maintain the valve head in the open condition. As soon as the valve head moves to the open position, the actuator pin 52 lifts slightly from its seat 55, so that the set spring 64 applies a spring retention force via the actuator pin 52 to the valve head 70 for maintaining the valve head in the open position.

Figure 7:
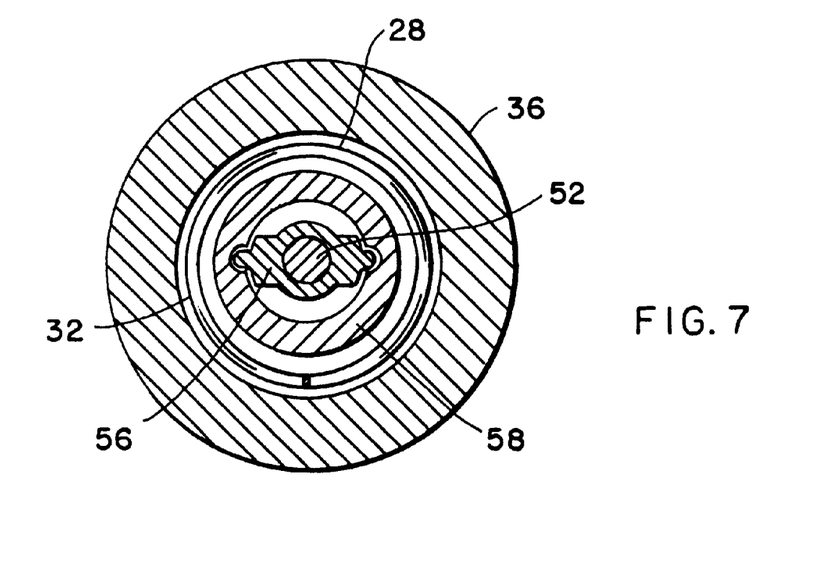
FIG. 7 is a horizontal sectional view taken generally on the line 7—7 of FIG. 6.
Figure 8:
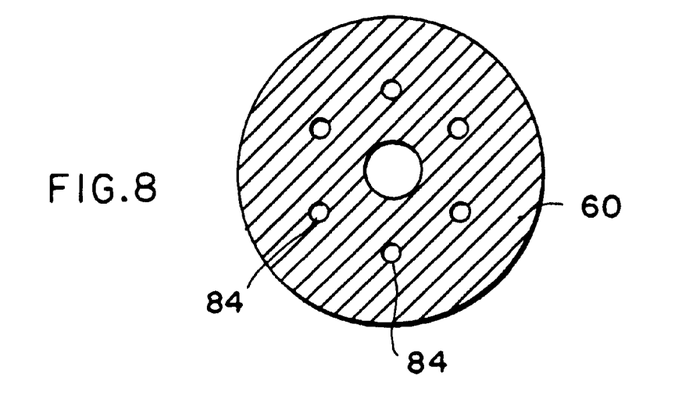
FIG. 8 is a horizontal sectional view taken generally of the line 8—8 of FIG. 6.

When the valve head 70 is open, water flows downwardly past the conical seat 72 and into the interior of the actuator housing 28. The upper end of the actuator sleeve 56 is noncircular in shape as shown in FIG. 7 to permit water flow downwardly between an open annulus or clearance 82 between the exterior of the support sleeve 58 and the interior bore 62 of the actuator housing 28. A plurality of apertures 84 are formed in the base plate 60 (FIGS. 6 and 8) to permit the water to pass further downwardly to water the underlying suspended plant. As water is delivered to the potted plant, the weight thereof increases to compress the main spring 32 with resultant expansion of the set spring 64. Such elongation of the set spring 64 progressively reduces the spring retention force applied to the valve head 70 until the trigger point at which the set spring force is insufficient to maintain the valve head in the open position against the force of the water pressure applied thereto, to result in closure of the valve head 70 and cessation of water flow to the potted plant. The specific maximum weight or set point at which water flow is halted is adjustably set in the manner previously described by appropriately advancing or retracting the adjustment screw 66 relative to the actuator sleeve 56.

Subsequent reduction in the weight of the potted plant, as the plant and soil dry over time, is accompanied by extension of the main spring 32 and a corresponding compression of the set spring 64 in the same manner as described previously with respect to FIGS. 1–4. Eventually, the carrier vertically lifts the potted plant sufficiently to move the actuator pin 52 back into operative engagement with the valve head 70 to turn the water flow back on. The embodiment of FIGS. 5–8 thus also provides a relatively simple and easily set watering device, but wherein the irrigation water is delivered directly through the hanger bracket 22 to the suspended potted plant. In this regard, the embodiment of FIGS. 5–8 is best suited for use in delivering water to a single suspended potted plant, whereas the embodiment of FIGS. 1–4 may be used to water a single plant or alternately used in a system wherein one suspended potted plant comprises a master plant for controlling delivery of water to a plurality of additional slave plants.

The automatic watering device of the present invention thus responds to the weight of a potted plant to turn water flow on and off as the weight varies between predetermined maximum and minimum weight set points. The delivery of water to the suspended potted plant may, of course, occur over a relatively short time period, or over a relatively prolonged time period, in accordance with the water pressure and flow rate through the supply lines. Moreover, when the watering device is used as depicted in FIG. 1 to control the supply of water to multiple slave plants, the time delay between initiation and halting of water flow to the master plant can be used to deliver water in different volumetric amounts to the slave plants by appropriately varying the size of the flow lines thereto. In addition, while the system is shown relative to a group of potted plants, it will be understood that one or more of the slave water lines can be coupled to any other site requiring periodic watering, such as a flower box or bed, or a lawn area, or the like.

A variety of further modifications and improvements in and to the improved automatic watering device of the present invention will be apparent to those persons skilled in the art. Accordingly, no limitation on the invention is intended by way of the foregoing description and accompanying drawings except as set forth in the appended claims.

What is claimed is:

1. A watering device for delivering water to a potted plant, said watering device comprising:

hanger means for hanging from a support structure;

a control member carried by said hanger means and including an electrical switch movable between a first position and second position for respectively turning a water supply on and off for controlled supply of water to a potted plant;

a carrier adapted for suspended support of the potted plant;

resilient means for movably supporting said carrier relative to said hanger means in response to the weight of the potted plant; and actuator means on said carrier for moving said control member to said first position to turn the water supply on when the weight of the potted plant reaches a predetermined minimum weight, and for permitting movement of said control member to said second position to turn the water supply off when the weight of the potted plant reaches a predetermined maximum weight, said actuator means including means for adjustably selecting said predetermined minimum and maximum weights.

2. The watering device of claim 1 wherein said electrical switch includes a contact arm movable between a closed position for turning the water supply on and a normal open position for turning the water supply off.

3. The watering device of claim 2 wherein said contact arm of said control member is spring-loaded to said normal open position.

4. The watering device of claim 2 further including a water flow line for supplying water to the potted plant, and flow control valve means for regulating water flow through said flow line to the potted plant, said flow control valve means being operatively controlled by said switch.

5. The watering device of claim 1 wherein said resilient means comprises a main spring reacting between said hanger means and said carrier.

6. The watering device of claim 1 wherein said carrier is mounted about said hanger means for vertical displacement relative to said hanger means, said resilient means comprising a main spring reacting between said hanger means and said carrier for normally urging said carrier in an upward direction about said hanger means.

7. The watering device of claim 1 wherein said control member is movable to said first position in response to a first force and is retained in said first position in response to a second force having a magnitude less than said first force.

8. The watering device of claim 1 wherein said actuator mean comprises:
    an actuator member carried by said carrier for vertical positional adjustment relative to said carrier, an actuator pin carried by said actuator member for vertical sliding movement with respect thereto, an adjustment screw carried by said actuator member for vertical positional adjustment with respect thereto, and a set spring reacting between said adjustment screw and said actuator pin for urging said actuator pin upwardly for operating said control member;
    said actuator member being vertically adjustable on said carrier for displacing said actuator pin to variably select a predetermined minimum weight set point at which said actuator pin moves said control member to said first position to turn the water supply on, said set spring retaining said actuator pin in operative engagement with said control member with an initial retention force sufficient to retain said control member in said first position to maintain the water supply in an on condition, said set spring extending as water is delivered to the potted plant to progressively reduce the magnitude of said retention force;
    said adjustment screw being vertically adjustable on said actuator member to variably select said retention force initially applied by said set spring to said actuator pin when the water supply is turned on, thereby variably selecting a predetermined maximum weight set point at which said retention force is insufficient to retain said control member in said first position to allow movement of said control member to said second position to turn the water supply off.

9. The watering device of claim 8 wherein said control member is movable to said first position in response to a first force and is retained in said first position in response to a second force having a magnitude less than said first force, said retention force applied initially by said set spring when the water supply is turned on being greater than said second force but less than said first force.

10. A watering device for delivering water to a potted plant, said watering device comprising:
    hanger means for hanging from a support structure;
    a control member carried by said hanger means and including an electrical switch movable between a first position and second position for respectively turning a water supply on and off for controlled supply of water to a potted plant;
    a carrier adapted for suspended support of the potted plant;
    resilient means for movably supporting said carrier relative to said hanger means in response to the weight of the potted plant; and
    actuator means on said carrier for moving said control member to said first position to turn the water supply on when the weight of the potted plant reaches a predetermined minimum weight, and for permitting movement of said control member to said second position to turn the water supply off when the weight of the potted plant reaches a predetermined maximum weight;
    said actuator means comprising an actuator member carried by said carrier for vertical positional adjustment relative to said carrier, an actuator pin carried by said actuator member for vertical sliding movement with respect thereto, an adjustment screw carried by said actuator member for vertical positional adjustment with respect thereto, and a set spring reacting between said adjustment screw and said actuator pin for urging said actuator pin upwardly for operating said control member;
    said actuator member being vertically adjustable on said carrier for displacing said actuator pin to variably select a predetermined minimum weight set point at which said actuator pin moves said control member to said first position to turn the water supply on, said set spring retaining said actuator pin in operative engagement with said control member with an initial retention force sufficient to retain said control member in said first position to maintain the water supply in an on condition, said set spring extending as water is delivered to the potted plant to progressively reduce the magnitude of said retention force;
    said adjustment screw being vertically adjustable on said actuator member to variably select said retention force initially applied by said set spring to said actuator pin when the water supply is turned on, thereby variably selecting a predetermined maximum weight set point at which said retention force is insufficient to retain said control member in said first position to allow movement of said control member to said second position to turn the water supply off.

11. The watering device of claim 10 wherein said electrical switch includes a contact arm movable between a closed position for turning the water supply on and a normal open position for turning the water supply off.

12. The watering device of claim 11 further including a water flow line for supplying water to the potted plant, and flow control valve means for regulating water flow through said flow line to the potted plant, said flow control valve means being operatively controlled by said switch.

13. The watering device of claim 10 wherein said resilient means comprises a main spring reacting between said hanger means and said carrier.

14. The watering device of claim 10 wherein said carrier is mounted about said hanger means for vertical displacement relative to said hanger means, said resilient means comprising a main spring reacting between said hanger means and said carrier for normally urging said carrier in an upward direction about said hanger means.

15. The watering device of claim 10 wherein said control member is movable to said first position in response to a first force and is retained in said first position in response to a second force having a magnitude less than said first force, said retention force applied initially by said set spring when the water supply is turned on being greater than said second force but less than said first force.

16. A watering device for delivering water to a potted plant, said watering device comprising:

hanger means for hanging from a support structure;

an electrical switch carried by said hanger means and including a contact arm movable between a closed position and a normal open position for respectively turning a water supply on and off for controlled supply of water to a potted plant;

a carrier adapted for suspended support of the potted plant;

resilient means for movably supporting said carrier relative to said hanger means in response to the weight of the potted plant; and actuator means on said carrier for moving said contact arm to said closed position to turn the water supply on when the weight of the potted plant reaches a predetermined minimum weight, and for permitting movement of said contact arm to said open position to turn the water supply off when the weight of the potted plant reaches a predetermined maximum weight.

17. The watering device of claim 16 wherein said actuator means further includes means for adjustably selecting said predetermined minimum and maximum weights.

18. The watering device of claim 16 further including a water flow line for supplying water to the potted plant, and flow control valve means for regulating water flow through said flow line to the potted plant, said flow control valve means being operatively controlled by said switch.

19. The watering device of claim 18 wherein said water flow line is further adapted for supplying water to additional plants, said switch operatively controlling said flow control valve means for regulating water flow through said flow line to the potted plant and to the additional plants.

20. A system for delivering water to a potted plant and to at least one additional plant, said system comprising:

a water flow line for supplying water to the potted plant and to the at least one additional plant;

flow control valve means for regulating water flow through said flow line to the potted plant and to the at least one additional plant;

hanger means for hanging from a support structure;

an electrical switch carried by said hanger means and including a contact arm movable between a closed position and normal open position for operating said flow control valve means for respectively turning a water supply on and off for controlled supply of water to the potted plant and to the at least one additional plant;

a carrier adapted for suspended support of the potted plant;

resilient means for movably supporting said carrier relative to said hanger means in response to the weight of the potted plant; and actuator means on said carrier for moving said contact arm to said closed position to turn the water supply or when the weight of the potted plant reaches a predetermined minimum weight, and for permitting return movement of said contact arm to said open position to turn the water supply off when the weight of the potted plant reaches a predetermined maximum weight.

21. The system of claim 20 wherein said actuator means further includes means for adjustably selecting said predetermined minimum and maximum weights.

* * * * *